United States Patent
Dale

(10) Patent No.: US 8,192,141 B1
(45) Date of Patent: Jun. 5, 2012

(54) DUAL COMPRESSION ROTOR

(75) Inventor: Mark R. Dale, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 980 days.

(21) Appl. No.: 12/156,808

(22) Filed: Apr. 7, 2008

Related U.S. Application Data

(60) Provisional application No. 60/910,266, filed on Apr. 5, 2007, provisional application No. 60/910,273, filed on Apr. 5, 2007.

(51) Int. Cl.
*F04D 19/02* (2006.01)

(52) U.S. Cl. .................................. 415/79; 415/199.5

(58) Field of Classification Search ............... 415/198.1, 415/199.4, 199.5, 79; 416/175, 203, 199
See application file for complete search history.

(56) References Cited

U.S. PATENT DOCUMENTS

| | | | | |
|---|---|---|---|---|
| 945,742 A * | 1/1910 | Boeckel et al. | | 415/79 |
| 2,326,072 A | 8/1943 | Seippel | | |
| 2,548,975 A * | 4/1951 | Hawthorne | | 60/268 |
| 2,694,291 A | 11/1954 | Rosengart | | |
| 2,790,596 A * | 4/1957 | Stirling | | 417/362 |
| 3,095,696 A * | 7/1963 | Rumble | | 415/79 |
| 3,233,866 A | 2/1966 | Davidovic | | |
| 3,269,120 A | 8/1966 | Sabatiuk | | |
| 3,549,272 A * | 12/1970 | Bauger et al. | | 415/79 |
| 3,756,019 A * | 9/1973 | Holzapfel et al. | | 415/79 |
| 3,818,695 A | 6/1974 | Rylewski | | |
| 3,892,069 A | 7/1975 | Hansford | | |
| 6,454,535 B1 * | 9/2002 | Goshorn et al. | | 416/193 R |
| 6,988,357 B2 | 1/2006 | Dev | | |
| 7,484,925 B2 * | 2/2009 | Carlson et al. | | 415/79 |
| 2004/0025490 A1 | 2/2004 | Paul | | |
| 2005/0138914 A1 | 6/2005 | Paul | | |
| 2007/0022738 A1 | 2/2007 | Norris | | |

FOREIGN PATENT DOCUMENTS

| | | |
|---|---|---|
| DE | 4213279 A1 * | 10/1993 |
| WO | WO 9304288 A1 * | 3/1993 |

OTHER PUBLICATIONS

DE 42 13 279 A Machine Translation. Accessed EPO website on Mar. 9, 2012. 2 Pages.*

* cited by examiner

*Primary Examiner* — Richard Edgar

(74) *Attorney, Agent, or Firm* — AFMCLO/JAZ; Rebecca Greendyke

(57) ABSTRACT

The present invention provides a gas turbine rotor having a first axial compression stage for compressing air in a first direction and a second axial compression stage for compressing the air in a second direction, the second direction being generally opposite the first direction.

12 Claims, 12 Drawing Sheets

DUAL COMPRESSION ROTOR

CROSS REFERENCE TO RELATED APPLICATIONS

The present application relates to and claims priority to U.S. Provisional Patent Application No. 60/910,266 filed Apr. 5, 2007, entitled "Revolutionary Innovative Turbine Engine" and U.S. Provisional Patent Application No. 60/910,273 filed Apr. 5, 2007, entitled "Dual Compression Rotor". Patent Application Nos. 60/910,266 and 60/910,273 are hereby incorporated by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to gas turbine engines, and in particular, relates to a gas turbine engine having a dual compression rotor.

BACKGROUND OF THE INVENTION

Gas turbine engines are well-known for providing propulsion and power production. Compared to other engine types, a gas turbine engine has the advantage that its rotors undergo purely rotational motion, and it can therefore operate at high speed with minimum vibration. In such engines, the theory of operation is described thermodynamically by the Brayton cycle: air is compressed isentropically, combustion of air/fuel mixture occurs, and expansion over turbine blades occurs isentropically back to the starting pressure. Such engines, however, typically operate efficiently only within a relatively narrow band of engine speeds.

Conventional modern turbine engines have to run at high temperatures to produce enough work to drive multiple stages of compression to achieve high pressure ratios and high efficiency. The high temperatures and pressures drive up design complexity and life cycle costs (development, production, maintenance). Also, these turbine engines are designed for optimum performance at one design point which causes the engines to operate less efficiently during off design conditions. That is, conventional turbine engines cannot produce the optimum higher pressure ratios at lower cruise power settings.

Another limitation of conventional turbine engines is the use of a rotor for each compressor and turbine stage, as well as a connecting shaft linking the compressor and turbine, which significantly increases the engine length, weight, and cost. Also, a limiting factor is the ability of steel, nickel, ceramic, or other engine materials to withstand extreme heat and pressure. These extreme temperatures require elaborate/complex secondary flow cooling circuits to maintain acceptable material properties, especially at the high pressure turbine bores. Unfortunately, these cooling systems reduce engine performance and add undesirable weight. Even when cooling systems are used in turbine engines, there is centrifugal and thermal growth of the rotors. Maintaining a gap between the rotor tips and the engine shroud to account for thermal growth causes large tip leakage losses and lower component performance and efficiency. Conventional turbine engines also have complex bearing systems that operate near maximum temperature limits and endure extreme shaft dynamics.

There are a myriad of known gas turbine engine configurations. One early example is illustrated in FIG. 1. The engine in FIG. 1 was designed by Hans von Ohain in 1937 and was designated the He.S3 turbojet engine. The combustor of the Ohain engine is positioned in the large unused space in front of the radial-flow compressor. Airflow through the He.S3 engine followed a generally S-shaped configuration.

U.S. Pat. No. 2,694,291 to Rosengart describes a rotor and combustion chamber arrangement for gas turbines. The turbine includes a stationary combustion chamber that is generally toroidal shaped and has a continuous opening at its inner periphery. Mounted on the rotor are hollow blades designed so that air and exhaust gases pass between the blades while cooling air passes within the hollows of the blades to facilitate cooling.

Another gas turbine example is described in U.S. Pat. No. 3,269,120 to Sabatiuk. Sabatiuk discloses a gas turbine engine having compressor and turbine passages in a single rotor element. The engine has axial flow compressor passages and radial flow turbine passages in a single rotor. Flow through the compressor passages is in a direction generally parallel to the axis of the rotor element, and flow through the turbine passages is in a radial direction at least for a portion of the length of the passages.

U.S. Pat. No. 3,892,069 to Hansford describes a propulsion unit for an aircraft that includes rotor means incorporating a multi-bladed fan which over an outer peripheral region thereof defines centrifugal flow compressor passages and centripetal flow turbine passages and an annular combustor encircling the rotor means. The combustor has inlet means for directing air from the compressor passages into the combustor and outlet means for directing combustion gases from the combustor into the turbine passages to drive the rotor means. Hansford's propulsion unit includes an air intake leading to a series of circularly distributed centrifugal flow compressor passages and includes an annular combustor which is of substantially toroidal shape and defines a combustion chamber of part circular cross-section.

In addition, Dev in U.S. Pat. No. 6,988,357 discloses a gas turbine engine including a combustion chamber section, a turbine section, and a compressor section. The turbine section surrounds the combustion chamber, and the compressor section surrounds the turbine section. The rear rotor of the turbine engine includes an integral compressor section on the outside and a turbine section on the inside.

Given the limitations of conventional gas turbine engines, there is a need for an improved engine that minimizes weight and fuel consumption while maximizing thrust and efficiency.

SUMMARY OF THE INVENTION

The gas turbine engine of the present invention (also referred to as the Revolutionary Innovative Turbine Engine (RITE)) incorporates technology that provides versatile mission capabilities in one configuration, including: maximum engine thrust for minimum takeoff and climb; minimum engine fuel consumption and vehicle drag for maximum range; and maximum power generation to meet increasing vehicle and weapon requirements.

The RITE cycle has infinite variability and applicability because each rotating stage can be controlled independently. The technology features that make up the RITE cycle include, but are not limited to: a dual compression rotor (DCR) for higher overall pressure ratios with minimum number of rotor stages; independently supported rotors (ISR) using hybrid and/or magnetic bearings for support in lieu of shafts; axial and centrifugal compressors controlled independently for optimum performance match; substantial reduction in overall engine length and weight; a dedicated turbine attached to each fan/compressor rotor (cooling air on-board if needed to control turbine metal temperatures (cooling air provided directly to turbine through radial passages in DCR); low turbine bore temperatures due to cool compressor inlet airflow bathing; hot sections located outboard for overall reduction of internal temperatures for bearings and mechanical systems; reduced thermal and centripetal bore growth for tighter turbine tip clearance; use of nickel material at high compressor exit temperature region; and inter turbine burners (ITB) to boost temperature and work capability after each turbine to lower maximum turbine temperature and net energy loss throughout the engine.

Other features include: fan-on-turbine which eliminates the need for a low pressure shaft; an internal starter for engine starting; generators that can be controlled by controlling the speed of each rotor separately for optimized operability (stage matching, power extraction and management (all electric, no gearbox required)); engine core can run at design point throughout mission profile because thrust requirements for flight can be independently controlled by the ITBs, greatly reducing engine thermal cycles and maintenance costs and increasing engine life; and a free/power turbine that matches inlet airflow to reduce vehicle drag (at lower power settings during vehicle cruise or loiter (the power turbine temperature can be independently increased to match inlet design flow by compensating for decreased fan flow). The power turbine drives a power generator which maximizes the use of gas path energy/efficiency, extracts energy to reduce engine gas temperature, and reduces power generation impact on the engine cycle. At lower power settings during vehicle cruise or loiter the power turbine temperature can be independently increased to maximize power extraction for avionics or directed energy weapons.

In an exemplary embodiment of the present invention, the core of the RITE includes the DCR which has two compression stages and a turbine, the centrifugal compressor which has one compression stage and a turbine, and two combustors (one main combustor and one ITB). The RITE core operates like two turbine engines in series, and it can be controlled that way. Numerous turbofan/turboshaft configurations can be built off the RITE core.

In accordance with one aspect of the present invention, there is provided a gas turbine rotor including a first axial compression stage for compressing air in a first direction and a second axial compression stage for compressing the air in a second direction. The second direction is generally opposite the first direction. The first axial compression stage may include a plurality of first blades for compressing the air in the first direction. The rotor may further include an intermediate ring connected to the plurality of first blades.

The second axial compression stage may include a plurality of second blades for compressing the air in the second direction. The plurality of second blades may be connected to the intermediate ring. The rotor may include a rim connected to the plurality of second blades. Also, the rotor may include a plurality of turbine blades connected to the rim. The plurality of turbine blades may be configured such that as exhaust gas passes over the plurality of turbine blades the rotor rotates clockwise. Alternatively, the plurality of turbine blades may be configured such that as exhaust gas passes over the plurality of turbine blades the rotor rotates counterclockwise.

In accordance with another aspect of the present invention, there is provided a gas turbine rotor including a plurality of first axial compression blades for compressing air in a first direction and a plurality of second axial compression blades for compressing the air in a second direction. The second direction is generally opposite the first direction. The rotor may further include an intermediate ring connected to outer radial ends of the plurality of first axial compression blades and connected to inner radial ends of the plurality of second axial compression blades. The intermediate ring may be a barrier between the air compressed by the plurality of first axial compression blades and the air compressed by the plurality of second axial compression blades.

The rotor may include a rim connected to outer radial ends of the plurality of second axial compression blades. Also, inner radial ends of a plurality of turbine blades may be connected to the rim. The rim may be a barrier between the air compressed by the plurality of second axial compression blades and exhaust gas traveling over the plurality of turbine blades. The rim may include, a plurality of radial passages for moving air compressed by the plurality of second axial compression blades to the plurality of turbine blades.

In accordance with a further aspect of the present invention, there is provided a gas turbine rotor including an inner ring, a plurality of first axial compression blades connected to the inner ring, an intermediate ring connected to the plurality of first axial compression blades, a plurality of second axial compression blades connected to the intermediate ring, a rim connected to the plurality of second axial compression blades, and a plurality of turbine blades connected to the rim.

The plurality of first axial compression blades may compress air axially in a backward direction when the rotor rotates. The plurality of second axial compression blades may compress the air in a forward direction when the rotor rotates. The plurality of turbine blades may be configured for rotating the rotor when exhaust gas passes by the plurality of turbine blades.

BRIEF DESCRIPTION OF THE DRAWINGS

The accompanying drawings incorporated in and forming a part of the specification, illustrate several aspects of the present invention and together with the description serve to explain the principles of the invention. In the drawings.

DETAILED DESCRIPTION OF THE INVENTION

Figure 1:
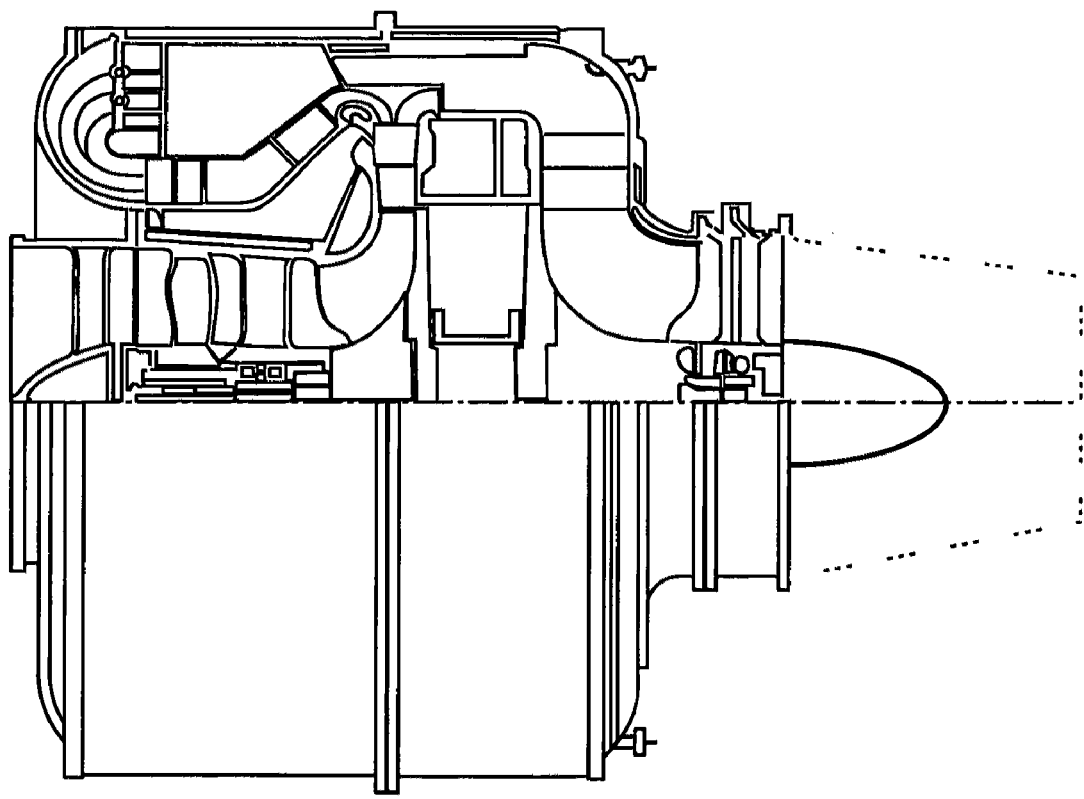
FIG. 1 is a prior art turbo jet engine.
Figure 2:
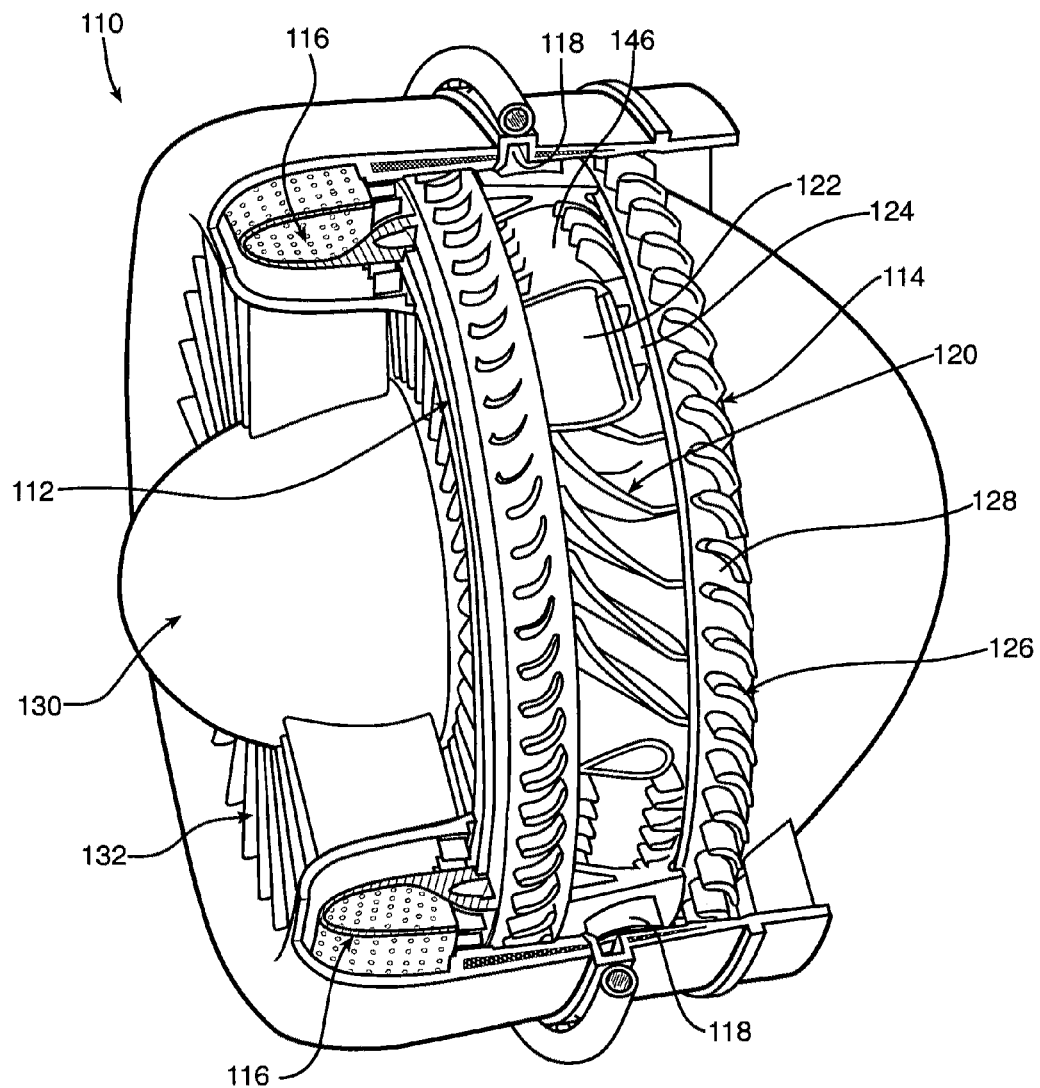
FIG. 2 is a perspective view of the gas turbine engine of the present invention.

Referring to the drawings, FIG. 2 shows a cut-away view of the engine of the present invention, also called the revolutionary innovative turbine engine (RITE) 110. The engine 110 generally includes a dual compression rotor 112, a centrifugal compression rotor 114, a combustion chamber 116, and an inter-turbine burner 118. The rotors 112 and 114 are independently supported about a common axis of rotation. Independent support allows the rotors 112 and 114 to rotate independently of each other as well as rotate in the opposite or same direction. For example, the dual compression rotor may rotate clockwise or counterclockwise, and the centrifugal compression rotor may rotate in the opposite direction. Alternatively, the rotors 112 and 114 may both rotate clockwise or counterclockwise. The dual compression rotor 112 is described in more detail with reference to FIG. 6.

The centrifugal compression rotor 114 includes a plurality of blades 120 designed for radial compression of airflow. An annular ring 122 is positioned near the outer edges of the blades 120. The ring 122 forces airflow through a narrow slit 124 to thereby compress air flowing through blades 120. A plurality of tip turbine blades 126 are radially connected with an outer rim 128 and are set at an angle (angle of attack) relative to the axial air/exhaust flow such that the exhaust flow over the blades 126 rotates the centrifugal compression rotor 114. The blades 126 may be angled to rotate the rotor 114 clockwise or counterclockwise. The annular ring 122 and slit 124 form a duct 146 for directing the compressed air in a forward direction and into the combustion chamber 116.

The combustion chamber 116 is annular shaped and is positioned in front of, or up inlet airflow stream of, the dual compression rotor 112. The interior portion of the chamber 116 is generally U-shaped. One end of the U-shape is the entrance of the chamber 116 while the other end is the exit. This configuration allows airflow to enter the chamber in one direction and allows exhaust to exit the chamber in generally the opposite direction (exhaust being the combustion of air and fuel). A second combustion chamber referred to as the inter-turbine burner 118 is positioned between the dual compression rotor 112 and centrifugal compression rotor 114. The burner 118 is generally annular in shape and is located behind the annular combustion chamber 116 near the periphery of the engine 110. Both the combustion chamber 116 and inter-turbine burner 118 are supplied with fuel via a fuel delivery system.

Moreover, the chamber 116 and burner 118 may be controlled independent of each other. That is, the combustion chamber 116 may be supplied with a greater amount of fuel than the burner 118, or vice versa. This independent control permits the operator or engine control computer to regulate the speed of the independently supported rotors: the dual compression rotor 112 and the centrifugal compression rotor 114 (and other rotors as described in subsequent embodiments). Independent control of the chamber 116 and burner 118 and of the rotors 112 and 114 provides optimum air compression at a variety of engine speeds, air densities, and vehicle velocities. Also, using the inter-turbine burner 118 allows the combustion chamber 116 to be operated at a relatively lower temperature compared to conventional gas turbine engines. In conventional engines, combustors can generate temperatures of 3600 degrees F. or higher. These extremely high temperatures are needed because there is a loss of heat as the exhaust travels back to the rear turbine blades. In the RITE 110, the combustor 116 temperature is significantly lower (for example, approximately 1900 degrees F.). The RITE's lower temperature reduces or eliminates the need for cooling systems and reduces the need for expensive heat-resistant materials.

Furthermore, any energy/heat that is lost after the combustion chamber 116 is reintroduced into the engine 110 by the inter-turbine burner 118 so that the rear turbine blades receive the optimum temperature and pressure. As can be seen by the foregoing explanation of the chamber 116 and burner 118, the RITE 110 creates a near-level temperature engine. That is, each rotor receives the optimal energy, unlike a conventional turbine engine which initially, at the combustor, has extremely high temperatures then the temperature continually decreases to the rear of the engine. Other advantages of the independent chamber 116 and burner 118 and of the independent rotors 112 and 114 are provided later in this section.

Also shown in the exemplary embodiment of FIG. 2 is a compressor rotor 130 positioned in front of the dual compression rotor 112. The compressor rotor 130 includes a plurality of fan blades 132 for axial compression of inlet air. The rotor 130 may be connected to the dual compression rotor 112 so that the rotors 112 and 130 rotate together. The connection between the rotors 112 and 130 may be rigid (i.e. one-to-one ratio) or may be geared such that compression rotor 130 spins slower or faster than the dual compression rotor 112. Alternatively, the rotor 130 may not be connected to the dual compression rotor 112, but rather may be connected with the centrifugal compression rotor 114 via a shaft. Again, there may be a one-to-one rotation or a gear system that allows the compression rotor 130 to spin slower or faster relative to the centrifugal compression rotor 114. Other configurations of the RITE with a fan rotor are described in subsequent embodiments, such as in FIG. 7.

Figure 3:
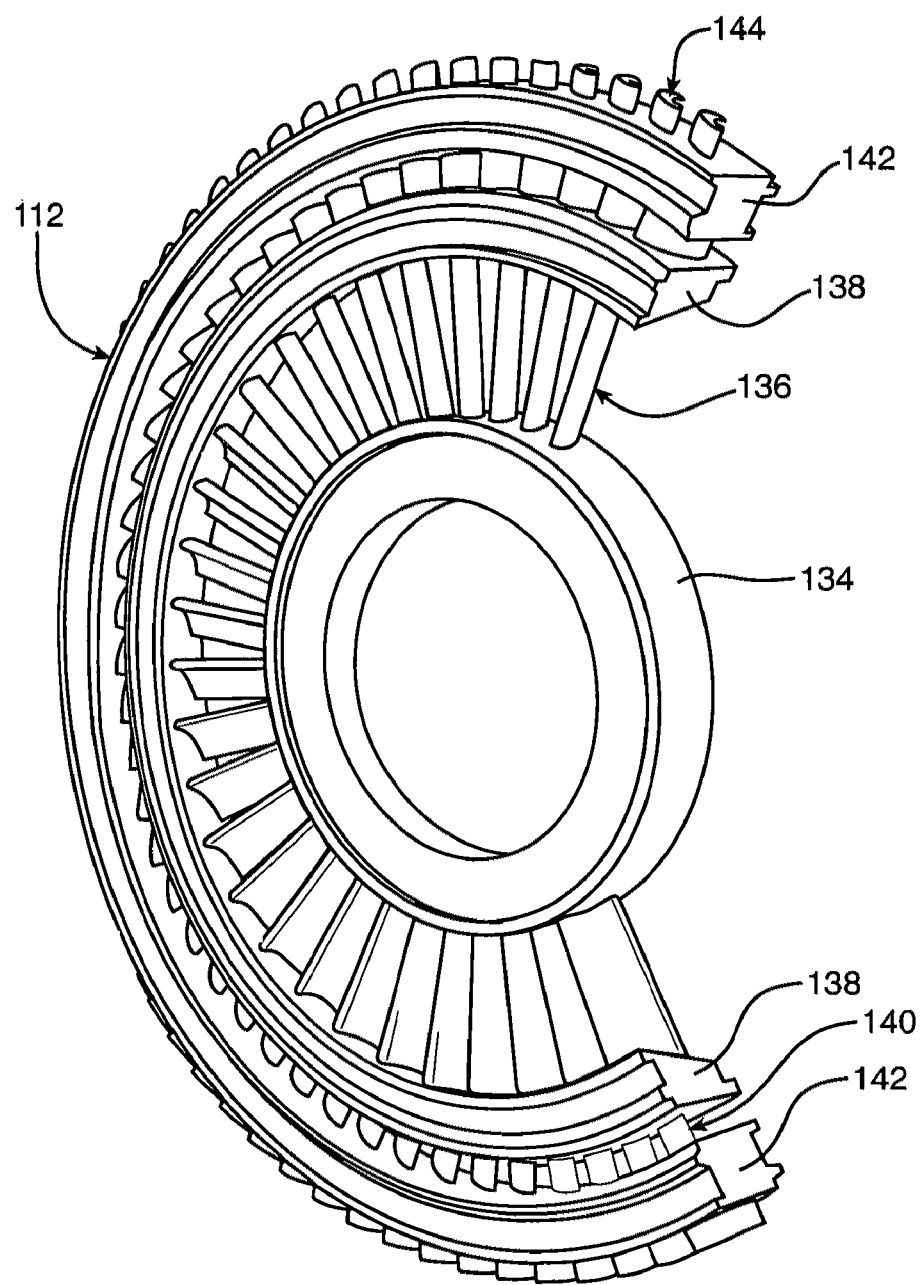
FIG. 3 is a cut-away, perspective view of a dual compression rotor.
Figure 4:
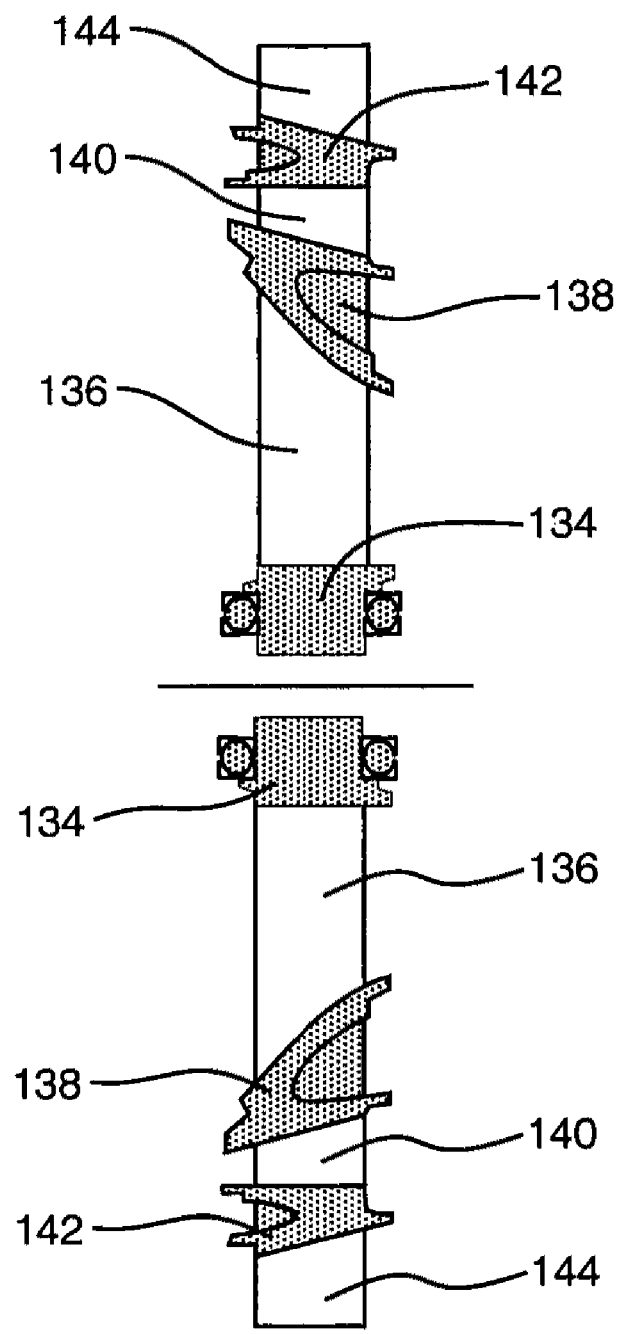
FIG. 4 is a cross-sectional view of the dual compression rotor.

Referring now to FIGS. 3 and 4, the dual compression rotor 112 compresses air through two stages and provides its own work from its turbine, all on the same rotor. This design configuration eliminates two rotors and a shaft system that connects them in a conventional turbine engine design. The rotor 112 reduces weight, length, and cost.

The dual compression rotor 112 includes an inner ring 134, a plurality of first stage axial compression blades 136, an intermediate ring 138, a plurality of second axial compression blades 140, an outer rim 142, and a plurality of tip turbine blades 144. The inner ring 134 may include bearings for rotational connection to a support structure. The plurality of first stage axial compression blades 136 are attached radially to the inner ring 134. The blades 136 are set at an angle (angle of attack) relative to the axial airflow such that as the rotor 112 spins the blades 136 move/compress air in a direction from the front of the engine to the back of the engine. The inner surface of the intermediate ring 138 is connected to the outer ends of the compression blades 136, while the second axial compression blades 140 are attached to the outer surface of the intermediate ring 138. The intermediate ring 138 functions as a structural support for the blades 136 and 140, as well as a barrier separating the airflow through the first axial compression blades 136 from the airflow through the second axial compression blades 140. The second axial compression blades 140 are radially connected with the intermediate ring 138 and are set at an angle (angle of attack) relative to the axial airflow such that the blades 140 move/compress air in a direction from the back of engine to the front of the engine. The airflow direction through the second axial compression blades 140 is opposite the airflow direction through the first axial compression blades 136.

The inner surface of the outer rim 142 is attached to the outer ends of the second axial compression blades 140. Connected to the outer surface of the outer rim 142 is a plurality of tip turbine blades 144. The rim 142 functions as a structural support for the blades 140 and 144, as well as a structure separating the airflow through the second axial compression blades 140 from the airflow through the tip turbine blades 144. The tip turbine blades 144 are radially connected with the rim 142 and are set at an angle (angle of attack) relative to the axial air/exhaust flow such that the exhaust flow over the blades 144 rotates the dual compression rotor 112. The blades 144 may be angled to rotate the rotor 112 clockwise or counterclockwise. As previously described, the interior portion of the combustion chamber 116 is U-shaped. Therefore, the exhaust flow through the tip turbine blades 144 moves in a direction from the front to the back of the engine (like the airflow through the first axial compression blades).

In operation, the rotor 112 performs two of the primary functions of the turbine engine Brayton cycle: compression and work extraction. Compression is performed by the two axial compressor stages (blades 136 and 140) and work extraction takes place at the tip turbine blades (144). The dual compression rotor can run at uncooled turbine inlet temperatures (for example 1900 degrees F.) because it does not take much work to drive two axial stages of compression.

However, if higher turbine inlet temperatures are needed to boost performance by adding additional compression stages in front of the dual compression rotor then turbine blade cooling air is on board via radial holes through the outer rim 142 and flows to the root of the turbine blades. The design of the dual compression rotor reduces thermal gradients and is cooled without engine performance penalties. As such, the dual compression rotor can be made from nickel-based or high temperature composite materials allowing for higher temperature capability.

Figure 5:
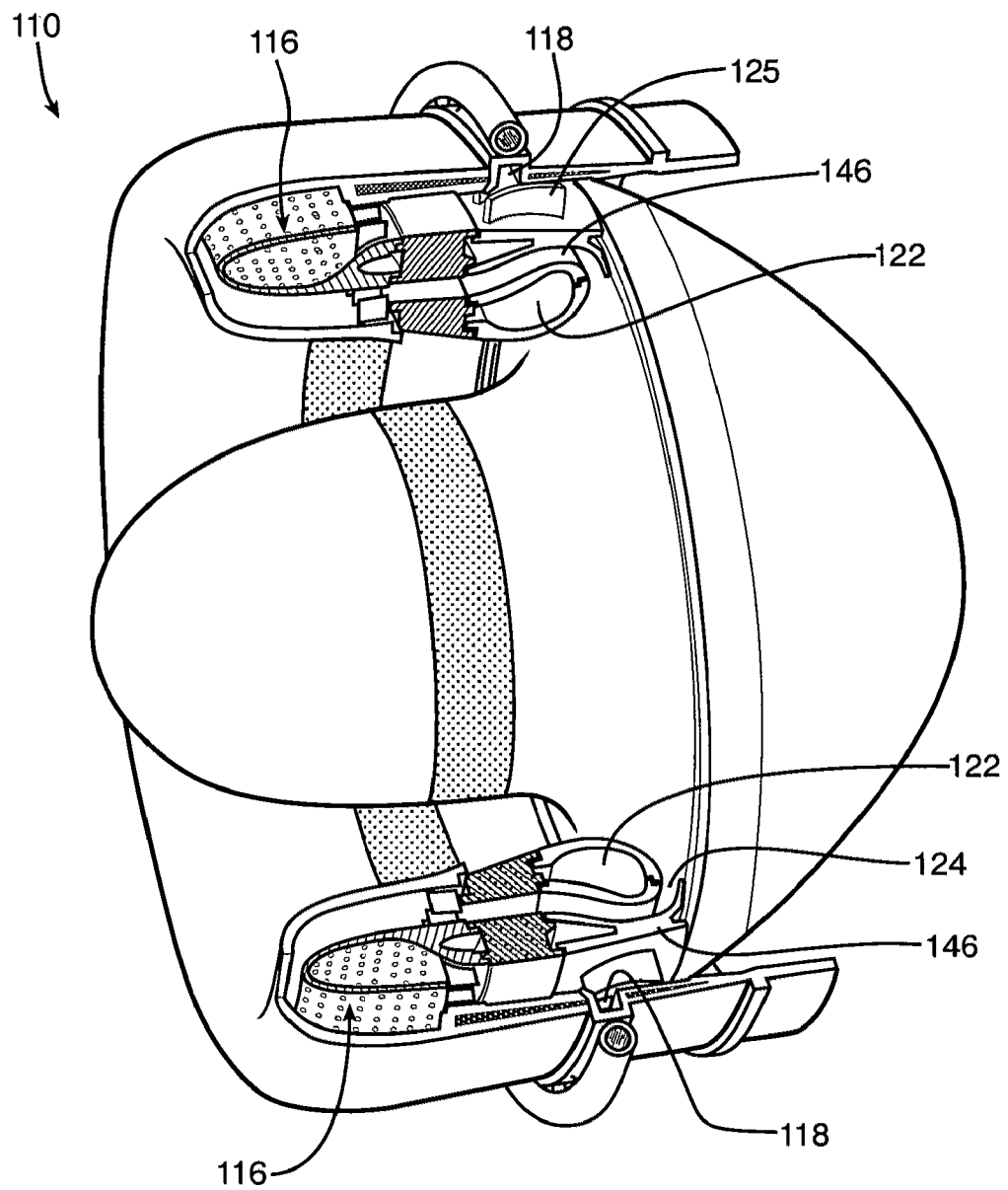
FIG. 5 is a perspective view of the present invention with the rotors not shown.

In FIG. 5, the RITE 110 is illustrated with substantial portions of the dual compression rotor 112 or centrifugal compression rotor 114 not shown. This drawing provides a more detailed view of the combustion chamber 116 and inter-turbine burner 118. The annular ring 122 and the body (not shown) of the centrifugal compression rotor 114 define the slit 124 through which air is compressed. The duct 146 steers the airflow forward to the dual compression rotor 112. Compressed air exiting the rotor 112 enters the combustion chamber 116. The U-shaped chamber 116 reroutes the airflow and exhaust gas aft towards the tip turbine blades of the rotor 112. The inter-turbine burner 118, positioned between the rotors 112 and 114, adds heat and energy to the exhaust which then travels through flow-steering stators XXX and to the tip turbine blades 126 (not shown) of the centrifugal compression rotor 114.

Figure 6:
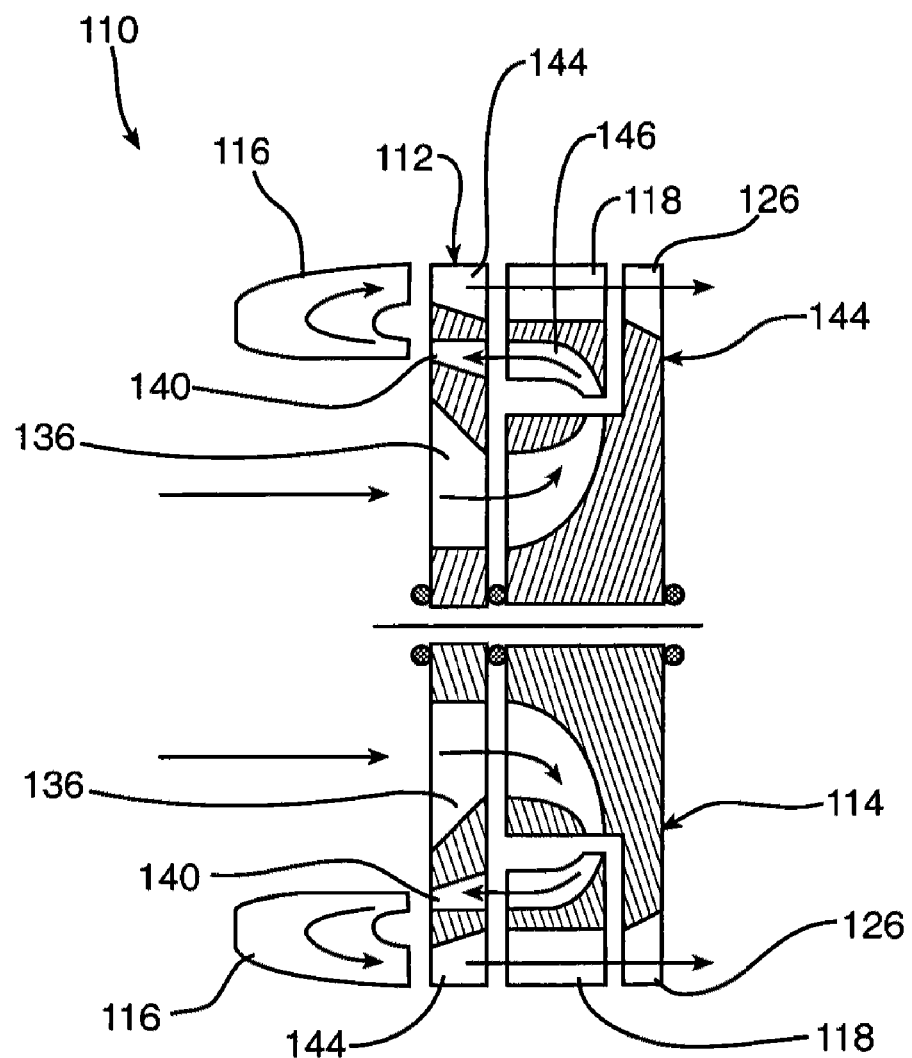
FIG. 6 is cross-sectional view of one embodiment of the gas turbine engine of the present invention.

The air/exhaust flow path of the RITE 110 can be seen in FIG. 6. Cool inlet air enters the dual compression rotor 112. The air gets compressed by the first axial compressor stage/blades 136. Then, the air enters the centrifugal compressor rotor 114 that further compresses the air. A duct 146 turns the airflow toward the front of the engine (typical turbine engines turn airflow toward the rear directly into the combustor). The ducted airflow then enters the dual compression rotor 112 to be compressed by the second axial compressor stage/blades 140. This compressed air mixes with fuel and burns in the combustor chamber 116. The exhaust gas passes through the tip turbine blades 144 to drive the dual compression rotor 112. Then, the exhaust flow enters the inter-turbine burner 118 to boost the temperature before passing through the tip turbine blades 126 to drive the centrifugal compression rotor 114.

Figure 7:
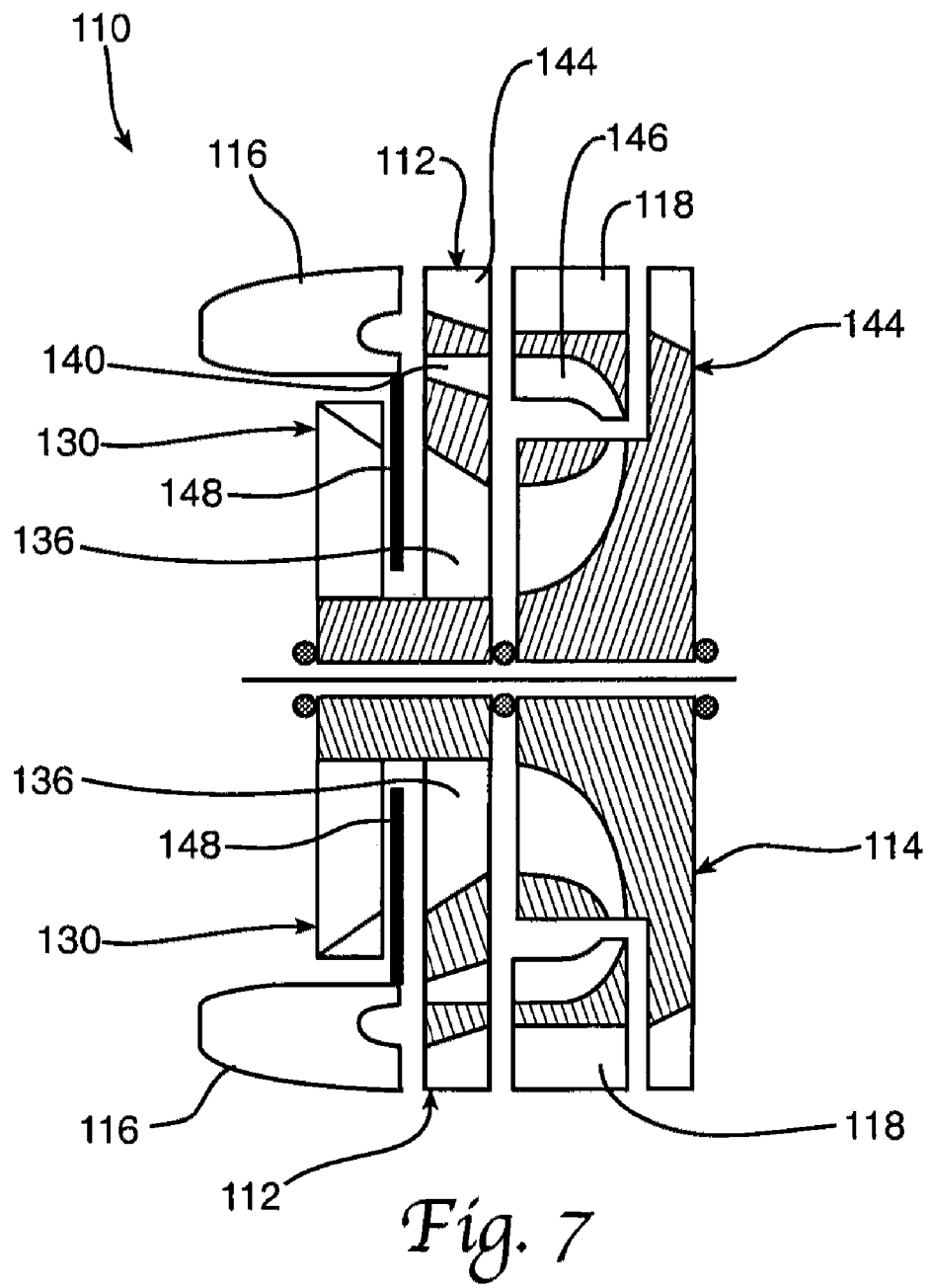
FIG. 7 is a cross-sectional view of another exemplary embodiment of the gas turbine engine of the present invention.

Another exemplary embodiment of the present invention is shown in FIG. 7. This embodiment is similar to the embodiment shown in FIG. 2. The RITE 110 includes a compressor rotor 130, a plurality of stators 148, a dual compression rotor 112, a centrifugal compression rotor 114, a combustion chamber 116, and an inter-turbine burner 118. The compressor rotor 130 is rotationally connected with the dual compression rotor 112. In operation, inlet air is compressed by the compressor rotor 130. The compressed air is redirected by the stators 140 then is compressed by the first axial compression stage/blades 136 of the dual compression rotor 112, and the centrifugal compression rotor 114. The duct 146 then turns the flow of compressed air forward and through the second axial compression stage/blades 140 of the dual compression rotor 112. The optimally compressed air is then mixed with fuel in the combustion chamber 116. The exhaust gas rotates the dual compression rotor 112 via the tip turbine blades 144. Then, the inter-turbine burner 118 increases the temperature/work capability of the exhaust gas which in turn rotates the centrifugal compression rotor 114 via the tip turbine blades 126. As described in a previous embodiment, the dual compression rotor and centrifugal compression rotor may be independently controlled by controlling the combustion chamber and inter-turbine burner independently.

Figure 8:
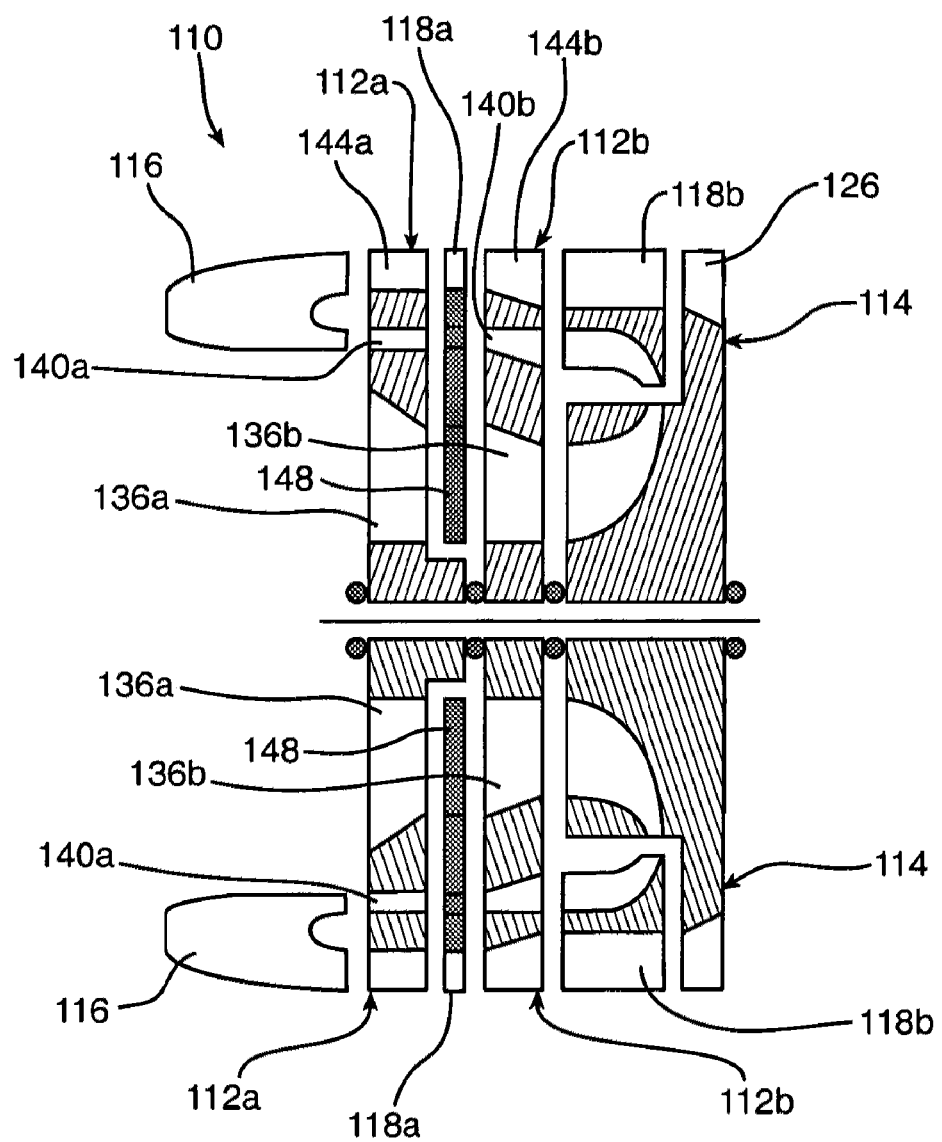
FIG. 8 is a cross-sectional view of a further exemplary embodiment of the gas turbine engine.

The exemplary embodiment of FIG. 8 has two dual compression rotors 112a and 112b and two inter-turbine burners 118a and 118b. The other components and features of the RITE shown in FIG. 8 are similar to the previously described embodiments. In the current embodiment, the two dual compression rotors 112a and 112b and centrifugal compression rotor 114 are independently supported rotors. That is, rotors 112a, 112b, and 114 may rotate independent of each other, and may rotate at different speeds relative to each other. Different rotor speeds are achieved by independently controlling the fuel burn in the combustion chamber 116 and the two inter-turbine burners 118a and 118b. The combustion chamber 116 generally controls the rotation of the first dual compression rotor 112a, the first inter-turbine burner 118a generally controls the rotation of the second compression rotor 112b, and the second inter-turbine burner 118b generally controls the rotation of the centrifugal compression rotor 114.

In operation, inlet air of the engine 110 in FIG. 8 is compressed, in order, by the first axial compression stage/blades 136a of the first dual compression rotor 112a (then redirected by the stators 140), the first axial compression stage/blades 136b of the second dual compression rotor 112b, the centrifugal compression rotor 114, the second axial compression stage/blades 140b of the second dual compression rotor 112b (then redirected by the stators 140), and the second axial compression stage/blades 140a of the first dual compression rotor 112a. After ignition in the combustion chamber 116, the exhaust flow, in turn, drives the first dual compression rotor 112a (via turbine blades 144a), gets reheated with inter-turbine burner 118a, drives the second dual compression rotor 112b (via turbine blades 144b), gets reheated with inter-turbine burner 118b, and drives the centrifugal compression rotor 114 (via turbine blades 126).

It is contemplated that the embodiment of FIG. 8 may include more than two dual compression rotors and/or more than two inter-turbine burners. In such a configuration, the inter-turbine burners would be placed between the rotors so the exhaust flow can be reheated to obtain higher pressure ratios.

Figure 9:
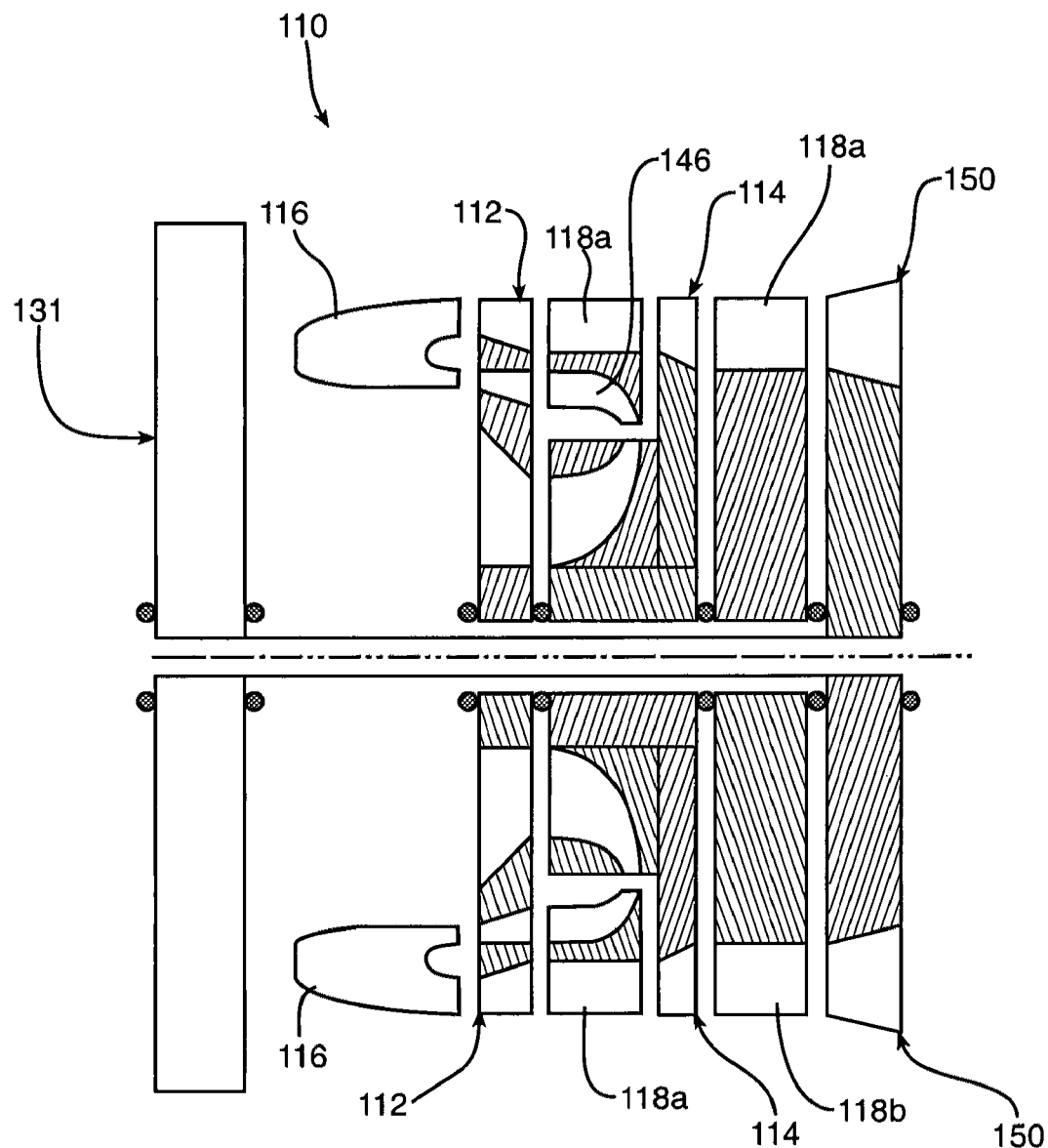
FIG. 9 is a cross-sectional view of another exemplary embodiment of the present invention.

Referring now to FIG. 9, the RITE 110 (turbofan configuration) includes a fan rotor 131, dual compression rotor 112, centrifugal compression rotor 114, duct 146, combustion chamber 116, first and second inter-turbine burners 118a and 118b, and turbine rotor 150. Turbine rotor 150 is connected with fan rotor 131 via a shaft for a one-to-one rotation ratio. Alternatively, the shaft may include a gearbox for providing a less than or greater than rotation ratio between rotors 131 and 150. The rotors 112, 114, and 131 with 150 are independently supported, and their speeds may be independently controlled by the combustion chamber 116 and inter-turbine burners 118a and 118b. The path of air/exhaust flow in this embodiment is substantially similar to previously described embodiments. One point of difference is that the second inter-turbine burner 118b drives the turbine rotor 150 which in turn drives the fan rotor 131. This embodiment may include other components described herein, such as two or more dual compression rotors, three or more inter-turbine burners, and two or more fan rotors/turbine rotors.

Figure 10:
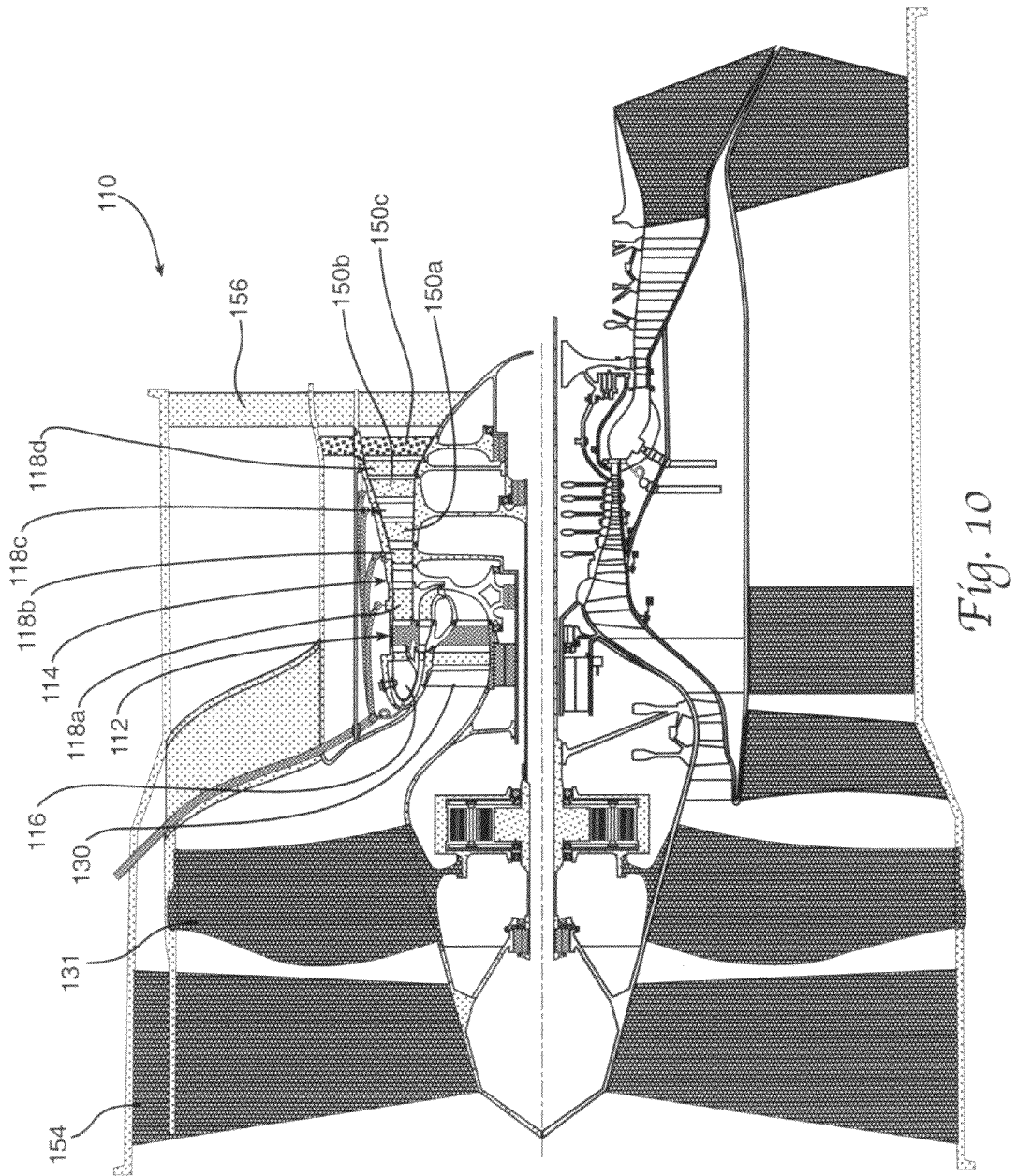
FIG. 10 is a split, cross-sectional view of an exemplary embodiment of the gas turbine engine on top and a conventional gas turbine engine on bottom.

The top half of FIG. 10 illustrates yet another embodiment of the present invention. The bottom half of FIG. 10 shows a conventional gas turbine engine (prior art). The two views are placed side-by-side for easy comparison and contrasting. For example, the RITE view shows a reduction in length, number of components, and complexity compared with a conventional gas turbine engine design concept. The top embodiment of FIG. 10 includes, in part, an inlet guide vane 154, one shaft- or gear-driven fan rotor 131, a compressor rotor 130 connected with a dual compression rotor 112, a centrifugal compression rotor 114, airflow duct 146, combustion chamber 116, four inter-turbine burners 118a-d, one turbine rotor with two stages 150a and 150b, one free/power turbine 150c, and an exit guide vane 156. The inter-turbine burner 118c is located between two turbine stages 150a and 150b of the same turbine rotor. The embodiment of FIG. 11 includes, in part, an inlet guide vane 154, one shaft- or gear-driven fan rotor 131, a compressor rotor 130 connected with a dual compression rotor 112, a centrifugal compression rotor 114, airflow duct 146, combustion chamber 116, three inter-turbine burners 118a-c, one turbine rotor 150a, one free/power turbine 150b, and an exit guide vane 156. The free/power turbine in FIGS. 10 and 11 extracts work from and controls the third stream by-pass air to match inlet airflow, thereby reducing airflow spillage and decreasing vehicle drag.

Figure 11:
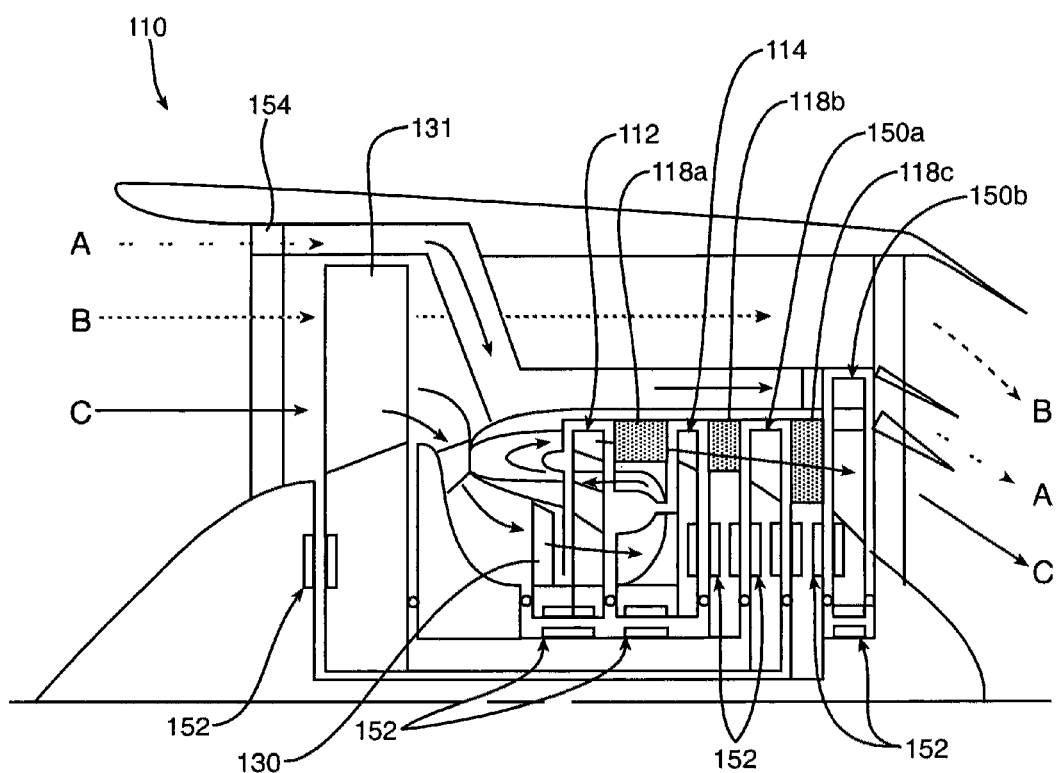
FIG. 11 is a cross-sectional view of a further exemplary embodiment having a third flow stream.

The air and exhaust flow can be better seen in FIG. 11. Air flows through the engine 110 through three paths: the inlet flow control path A, the main bypass flow path B, and the core flow path C. Path A airflow, third stream flow, varies to match the inlet design airflow, eliminating vehicle inlet spillage drag. In path A, fan-on-turbine rotor speed/airflow is controlled by inter-turbine burner 118c and power extraction. (Power extraction from an attached generator as subsequently described). Path B airflow, by-pass flow, varies the fan rotor speed/main bypass airflow to provide the required vehicle thrust and is controlled by inter-turbine burner 118b and power extraction. Path C airflow, flow through the RITE core, is kept constant at the core design point for highest efficiency.

Also shown in FIGS. 10 and 11 is a plurality of generators 152. One or more generators may be connected with each independently supported rotor, like the fan rotors, dual compression rotors, centrifugal compression rotor, and/or turbine rotors. Because the rotational speed of each independently support rotor can be controlled via the combustion chamber and/or inter-turbine burner, the output of each generator may be controlled. Having a plurality of independent generators provides several layers of backup and auxiliary power sources. When power demand is high, most or all generators can be activated and their output can be controlled. When the need for power is reduced, some independent generators may be taken off-line, and the inter-turbine burner(s) driving the rotor which turns the generator can be reduced, saving fuel and increasing efficiency. As seen in FIGS. 10 and 11, the power generating components of the generators may be positioned on a rotor as well as on a stationary support structure. It is contemplated that the generators may also function as magnetic bearings between rotors and between rotors and stationary support structures. These dual-use generators/magnetic bearings can eliminate the need for mechanical bearings which can add weight and require cooling systems.

Figure 12:
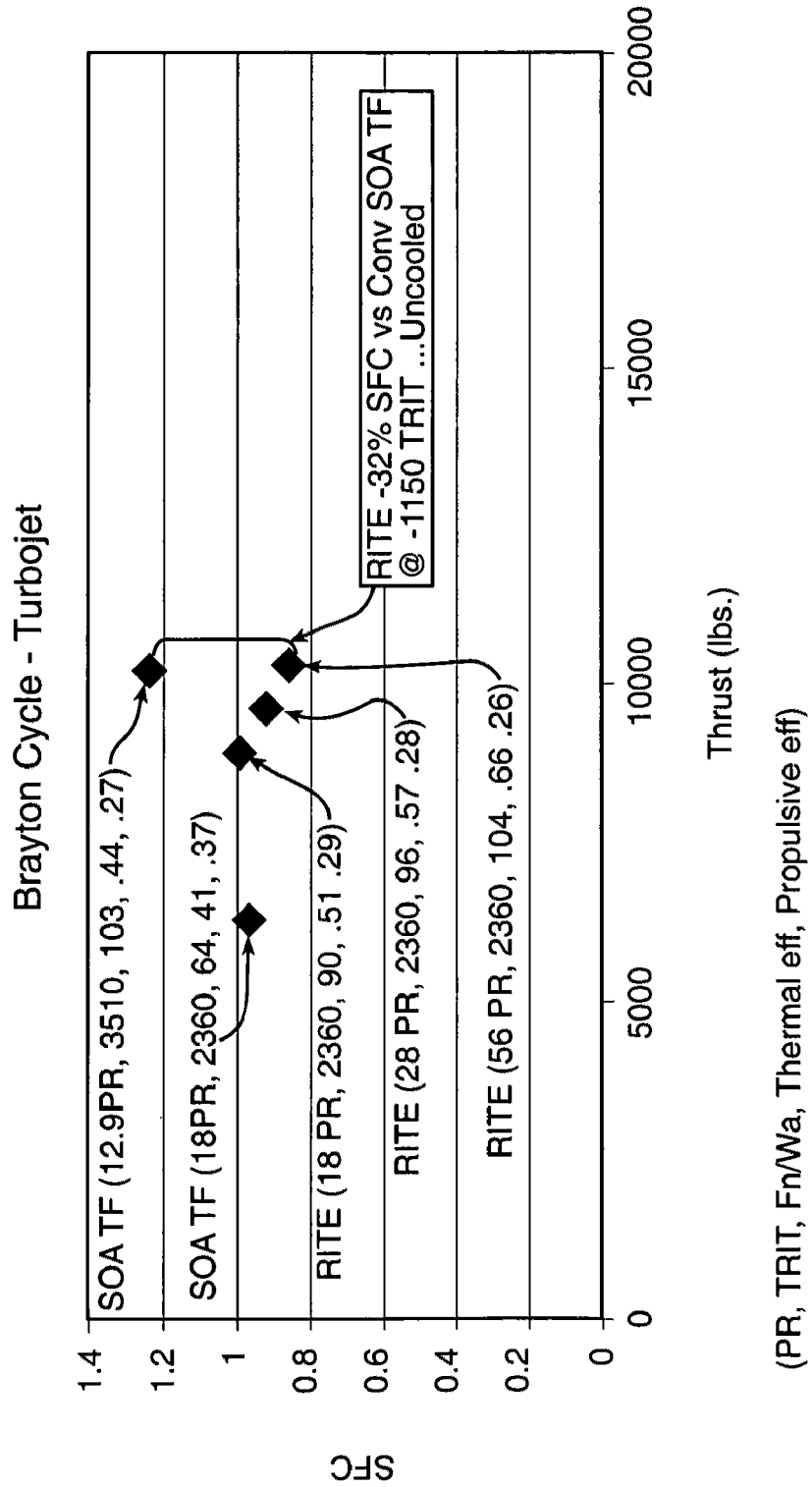
FIG. 12 is a chart showing specific fuel consumption versus thrust.

A Brayton cycle chart is illustrated in FIG. 12. In the graph, SOA TF is state of the art turbofan core, SFC is specific fuel consumption, PR is pressure ratio, TRIT is turbine rotor inlet temperature, Fn/Wa is thrust/airflow. Running the cores and turbojets (core with exhaust nozzle), the RITE has an improved SFC to thrust ratio compared to state of the art turbofan cores. RITE 1 corresponds to the embodiment shown in FIG. 6. RITE 2 corresponds to the embodiment of FIG. 7. RITE 3 corresponds to the embodiment of FIG. 8. Analysis shows that the RITE has one-third less fuel consumption compared to state-of-art engines at the same thrust level.

While various descriptions of the present invention are described above, it should be understood that the various features can be used singularly or in any combination thereof. Therefore, this invention is not to be limited to only the specifically preferred embodiments depicted herein. Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. A gas turbine rotor comprising:
a plurality of first axial compression blades configured for compressing air in a first direction, the plurality of first axial compression blades having a first blade quantity and a first blade height; and
a plurality of second axial compression blades configured for compressing the air from the first axial compression blades in a second direction, the second direction being generally opposite the first direction, the plurality of second axial compression blades having a second blade quantity that is greater than the first blade quantity and a second blade height that is less than the first blade height, wherein the plurality of second axial compression blades are discontinuous with the plurality of first axial compression blades and extend radially outward from the plurality of first axial compression blades such that the plurality of second axial compression blades are substantially coplanar with the plurality of first axial compression blades.

2. The rotor of claim 1 further comprising an intermediate ring connected to outer radial ends of the plurality of first axial compression blades and connected to inner radial ends of the plurality of second axial compression blades.

3. The rotor of claim 2 wherein the intermediate ring is a barrier between the air compressed by the plurality of first axial compression blades and the air compressed by the plurality of second axial compression blades.

4. The rotor of claim 3 further comprising a rim connected to outer radial ends of the plurality of second axial compression blades.

5. The rotor of claim 4 further comprising a plurality of turbine blades, wherein the plurality of turbine blades are discontinuous with the plurality of second axial compression blades such that the plurality of turbine blades have a third blade quantity that is greater than the second blade quantity and a third blade height that is greater than the second blade height, the inner radial ends of the plurality of turbine blades being connected to the rim.

6. The rotor of claim 5 wherein the plurality of turbine blades is configured such that the rotor rotates clockwise as exhaust gas passes over the plurality of turbine blades.

7. The rotor of claim 5 wherein the plurality of turbine blades is configured such that the rotor rotates counterclockwise as exhaust gas passes over the plurality of turbine blades.

8. The rotor of claim 5 wherein the rim is a barrier between the air compressed by the plurality of second axial compression blades and exhaust gas traveling over the plurality of turbine blades.

9. A gas turbine rotor comprising:
an inner ring;
a plurality of first axial compression blades connected to the inner ring, the plurality of first axial compression blades having a first blade quantity and a first blade height;
an intermediate ring connected to the plurality of first axial compression blades;
a plurality of second axial compression blades connected to the intermediate ring, the plurality of second axial compression blades having a second blade quantity that is greater than the first blade quantity and a second blade height that is less than the first blade height, wherein the plurality of second axial compression blades are discontinuous with the plurality of first axial compression blades;
a rim connected to the plurality of second axial compression blades; and
a plurality of turbine blades connected to the rim, the plurality of turbine blades having a third blade quantity that is greater than the second blade quantity and a third blade height that is greater than the second blade height, wherein the plurality of turbine blades are discontinuous with the plurality of second axial compression blades.

10. The rotor of claim 9 wherein the plurality of first axial compression blades compress air axially in a backward direction when the rotor rotates.

11. The rotor of claim 10 wherein the plurality of second axial compression blades compress the air in a forward direction when the rotor rotates.

12. The rotor of claim 11 wherein the plurality of turbine blades is configured for rotating the rotor when exhaust gas passes by the plurality of turbine blades.

\* \* \* \* \*